(12) United States Patent
Luttrell

(10) Patent No.: US 8,099,566 B2
(45) Date of Patent: Jan. 17, 2012

(54) LOAD/STORE ORDERING IN A THREADED OUT-OF-ORDER PROCESSOR

(75) Inventor: Mark A. Luttrell, Cedar Park, TX (US)

(73) Assignee: Oracle America, Inc., Redwood City, CA (US)

(*) Notice: Subject to any disclaimer, the term of this patent is extended or adjusted under 35 U.S.C. 154(b) by 433 days.

(21) Appl. No.: 12/466,611

(22) Filed: May 15, 2009

(65) Prior Publication Data

US 2010/0293347 A1 Nov. 18, 2010

(51) Int. Cl.
G06F 13/00 (2006.01)
G06F 13/28 (2006.01)

(52) U.S. Cl. . 711/156; 711/154; 711/170; 711/E12.001; 711/E12.002

(58) Field of Classification Search .................. 711/154, 711/156, 170, E12.001, E12.002
See application file for complete search history.

(56) References Cited

U.S. PATENT DOCUMENTS

| | | | |
|---|---|---|---|
| 6,240,502 B1 * | 5/2001 | Panwar et al. | 712/15 |
| 6,266,768 B1 * | 7/2001 | Frederick et al. | 712/220 |
| 6,721,874 B1 | 4/2004 | Le et al. | |
| 6,988,186 B2 | 1/2006 | Eickemeyer et al. | |
| 7,657,880 B2 * | 2/2010 | Wang et al. | 717/149 |
| 2003/0126409 A1 * | 7/2003 | Juan et al. | 712/216 |
| 2004/0154012 A1 * | 8/2004 | Wang et al. | 717/158 |
| 2009/0013135 A1 | 1/2009 | Burger et al. | |
| 2010/0169611 A1 * | 7/2010 | Chou et al. | 712/205 |
| 2010/0293347 A1 | 11/2010 | Luttrell | |
| 2010/0299499 A1 * | 11/2010 | Golla et al. | 712/206 |

* cited by examiner

*Primary Examiner* — Ly D Pham
(74) *Attorney, Agent, or Firm* — Rory D. Rankin; Meyertons, Hood, Kivlin, Kowert & Goetzel, P.C.

(57) ABSTRACT

Systems and methods for efficient load-store ordering. A processor comprises a store buffer that includes an array. The store buffer dynamically allocates any entry of the array for an out-of-order (o-o-o) issued store instruction independent of a corresponding thread. Circuitry within the store buffer determines a first set of entries of the array entries that have store instructions older in program order than a particular load instruction, wherein the store instructions have a same thread identifier and address as the load instruction. From the first set, the logic locates a single final match entry of the first set corresponding to the youngest store instruction of the first set, which may be used for read-after-write (RAW) hazard detection.

20 Claims, 5 Drawing Sheets

LOAD/STORE ORDERING IN A THREADED OUT-OF-ORDER PROCESSOR

BACKGROUND OF THE INVENTION

1. Field of the Invention

This invention relates to computing systems, and more particularly, to efficient load-store ordering.

2. Description of the Relevant Art

Modern microprocessors typically buffer store instructions while waiting for these instructions to retire or be conveyed to a memory subsystem. A store buffer (SB) is a hardware structure configured to buffer store instructions, or write operations. A read-after-write (RAW) hazard may occur when a load instruction, or a read operation, attempts to read a memory location that has been modified by an older (in program order) store instruction that has not yet committed its results to the memory location.

Generally, modern microprocessors implement out-of-order instruction issue and out-of-order instruction execution. Therefore, it is possible for a store instruction younger (in program order) than a particular load instruction to issue for execution before the particular load instruction. A RAW hazard does not exist between this younger store instruction and this particular load instruction. Following, a verification step, such as determining an address match between the two instructions, may not be needed. However, multi-threading and dynamic allocation make the determination more complex.

For a multi-threaded processor, a single-threaded SB may not be replicated by the number of threads in the multi-threaded processor due to on-chip real estate constraints. Also, a multi-threaded processor may not comprise a SB that is divided into sections, wherein each section corresponds to a particular thread. This is an inefficient use of SB entries. For example, one thread may not be utilizing the SB as frequently as a second thread or the one thread may not be executing at all, but the second thread is unable to efficiently utilize the available SB entries since these entries are not assigned to the second thread. Therefore, a multi-threaded processor may utilize a SB with dynamic allocation of its entries. In addition, with dynamic allocation, the SB entries may be used in both single-threaded and multi-threaded modes of operation.

However, a caveat with dynamic allocation is there does not exist a relationship, implied or otherwise, between a SB entry and the order of a corresponding store instruction with respect to other store and load instructions in the pipeline. Accordingly, the determination of load-store RAW hazards becomes more complex as logic needs to ascertain the SB entries that are older (in program order) than a particular load instruction given that an index of the store instructions buffered in the SB does not provide age ordering information.

In view of the above, efficient methods and mechanisms for load-store ordering are desired.

SUMMARY OF THE INVENTION

Systems and methods for efficient load-store ordering are contemplated. In one embodiment, a processor comprises a store buffer that includes an array, corresponding to two or more threads, wherein each entry of the array stores, for an out-of-order (o-o-o) issued store instruction, a thread identifier (TID), an address, and age information relative to at least one other o-o-o issued store instruction. The store buffer dynamically allocates any entry of the array entries for an o-o-o issued store instruction independent of a corresponding thread. Circuitry within the store buffer determines a first set of entries of the array entries that have store instructions older in program order than a particular load instruction, wherein the store instructions have a same TID and address as the load instruction. The logic also determines a second set of entries corresponding to entries of the first set that do not have the youngest store instruction of the first set. Finally, the logic combine the first set and the second set in a manner to locate a single final match entry of the first set corresponding to the youngest store instruction of the first set, which may be used for read-after-write (RAW) hazard detection.

These and other embodiments will become apparent upon reference to the following description and accompanying drawings.

Figure 1:
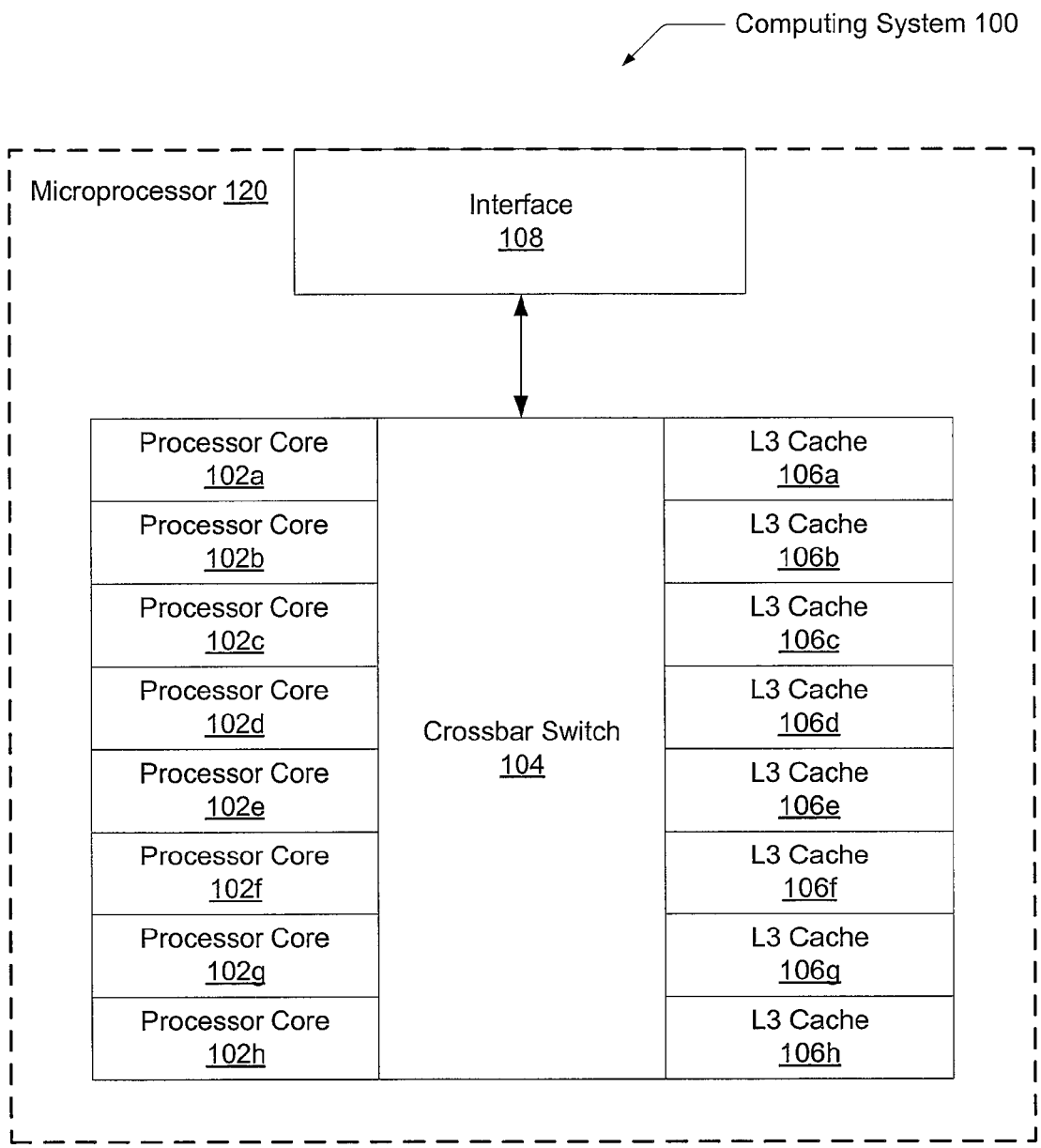
FIG. 1 is a generalized block diagram illustrating one embodiment of a computing system with a multi-threaded microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a computing system 100 with a microprocessor 120 comprising multiple instantiated cores 102a-102h is shown. In one embodiment, microprocessor 120 may be a standalone processor within a mobile laptop system, a desktop, an entry-level server system, a mid-range workstation, or other. For such an embodiment, microprocessor 120 may internally utilize a system bus controller for communication, which may be integrated in crossbar switch 104 or it may be a separate design. A system bus controller may couple microprocessor 120 to outside memory, input/output (I/O) devices such as computer peripherals, a graphics processing unit (GPU), or other. In such an embodiment, logic within such a system bus controller may replace or incorporate the functionality of a memory controller and interface logic 108.

In another embodiment, microprocessor 120 may be included in multiple processing nodes of a multi-socket system, wherein each node utilizes a packet-based link for inter-node communication. In addition to coupling processor cores 102a-102h to L3 caches 106a-106h, crossbar switch 104 may incorporate packet processing logic. Generally speaking, such logic may be configured to respond to control packets received on outside links to which microprocessor 120 may be coupled, to generate control packets in response to processor cores 102a-102h and/or cache memory subsystems, to generate probe commands and response packets in response to transactions selected by interface logic 108 for service, and to route packets for which microprocessor 120 may be included in a node that is an intermediate node to other nodes through interface logic 108. Interface logic 108 may include logic to receive packets and synchronize the packets to an internal clock used by packet processing logic.

As used herein, elements referred to by a reference numeral followed by a letter may be collectively referred to by the numeral alone. For example, processor cores 102a-102h may be collectively referred to as processor cores, or cores, 102. In one embodiment, microprocessor 120 has eight instantiations of a processor core 102. Each processor core 102 may utilize conventional processor design techniques such as complex branch prediction schemes, out-of-order execution, and register renaming techniques.

Each core 102 may include circuitry for executing instructions according to a predefined instruction set. For example, the SPARC instruction set architecture (ISA) may be selected. Alternatively, the x86, x86-64, Alpha, PowerPC, MIPS, PA-RISC, or any other instruction set architecture may be selected. Generally, processor core 102 may access a cache memory subsystem for data and instructions. Each core 102 may contain its own level 1 (L1) and level 2 (L2) caches in order to reduce memory latency. These cache memories may be integrated within respective processor cores 102. Alternatively, these cache memories may be coupled to processor cores 102 in a backside cache configuration or an inline configuration, as desired.

The L1 cache may be located nearer a processor core 102 both physically and within the cache memory hierarchy. Crossbar switch 104 may provide communication between the cores 102 and L3 caches 106. In one embodiment, crossbar switch 104 may include logic, such as multiplexers or a switch fabric, that allows any L2 cache to access any bank of L3 cache 106, and that conversely allows data to be returned from any L3 bank to any L2 cache. Additionally, in one embodiment, crossbar switch 104 may be configured to arbitrate conflicts that may occur when multiple L2 caches attempt to access a single bank of L3 cache 106, or vice versa.

In addition, cores 102 may be coupled to double data rate dual in-line memory modules (DDR DIMM) that reside on a circuit board outside microprocessor 120. In one embodiment, DDR DIMM channel(s) may be on-chip in order to couple the cores 102 to the DDR DIMM off-chip. Each L3 cache 106 may be coupled to a memory controller or a dynamic random access memory (DRAM) channel for communication to DRAM that resides off-chip. Also, an interface to a system bus may be coupled to each L3 cache 106.

In one embodiment, each processor core 102 may support execution of multiple threads. Multiple instantiations of a same processor core 102 that is able to concurrently execute multiple threads may provide high throughput execution of server applications while maintaining power and area savings. A given thread may include a set of instructions that may execute independently of instructions from another thread. For example, an individual software process either within a software application, may consist of one or more threads that may be scheduled for execution by an operating system. Such a core 102 may also be referred to as a multithreaded (MT) core. In one embodiment, each of the cores 102 may be configured to concurrently execute instructions from a variable number of threads, such as up to eight concurrently executing threads. In an 8-core implementation, microprocessor 120 could thus concurrently execute up to 64 threads.

In one embodiment, each of cores 102 may be configured for multithreaded, out-of-order execution. More specifically, in one embodiment, each of cores 102 may be configured to perform dynamic multithreading. Generally speaking, under dynamic multithreading, the execution resources of cores 102 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be input/output (I/O)-bound rather than processor-bound-completion of an individual request may need I/O accesses (e.g., to relatively slow memory, network, or storage devices) that dominate the overall time needed to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to dynamically allocate processor resources in a manner that flexibly adapts to workloads that vary along the continuum described above. In one embodiment, cores 102 may be configured to implement fine-grained multithreading, in which each core may select instructions to execute from among a pool of instructions corresponding to multiple threads, such that instructions from different threads may be scheduled to execute adjacently. For example, in a pipelined embodiment of core 102 employing fine-grained multithreading, instructions from different threads may occupy adjacent pipeline stages, such that instructions from several threads may be in various stages of execution during a given core processing cycle. Through the use of fine-grained multithreading, cores 102 may be configured to efficiently process workloads that depend more on concurrent thread processing than individual thread performance.

In one embodiment, cores 102 may also be configured to implement out-of-order processing, speculative execution, register renaming and/or other features that improve the performance of processor-dependent workloads. Moreover, cores 102 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 102 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
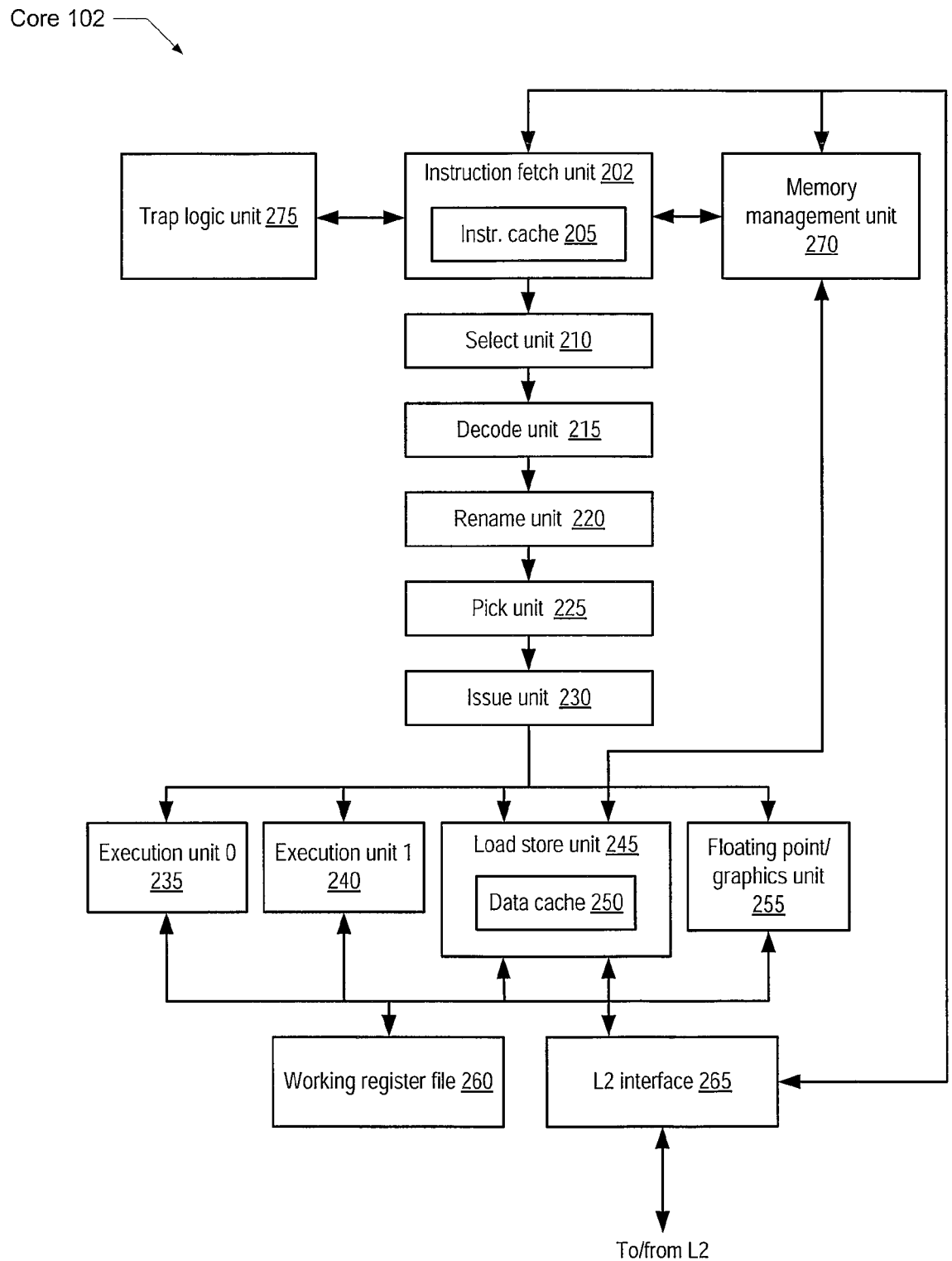
FIG. 2 is a generalized block diagram illustrating one embodiment of a processor core configured to perform dynamic multithreading.

One embodiment of core 102 that is configured to perform dynamic multithreading is illustrated in FIG. 2. In the illustrated embodiment, core 102 includes an instruction fetch unit (IFU) 202 that includes an L1 instruction cache 205. IFU 202 is coupled to a memory management unit (MMU) 270, L2 interface 265, and trap logic unit (TLU) 275. IFU 202 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a L1 data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 102 are described. However, it is noted that the illustrated partitioning of resources is merely one example of how core 102 may be implemented. Alternative configurations and variations are possible and contemplated.

Instruction fetch unit 202 may be configured to provide instructions to the rest of core 102 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, virtual to physical address translation may occur by mapping a virtual page number to a particular physical page number, leaving the page offset unmodified. Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that needs further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur.

In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc. In one embodiment, TLU 275 may be configured to flush all instructions from the trapping thread from any stage of processing within core 100, without disrupting the execution of other, non-trapping threads.

In the illustrated embodiment, L2 interface 265 may be configured to provide a centralized interface to the L2 cache associated with a particular core 102, on behalf of the various functional units that may generate L2 accesses. In one embodiment, L2 interface 265 may be configured to maintain queues of pending L2 requests and to arbitrate among pending requests to determine which request or requests may be conveyed to L2 cache during a given execution cycle.

In one embodiment, during each execution cycle of core 102, IFU 202 may be configured to select one thread that will enter the IFU processing pipeline. Thread selection may take into account a variety of factors and conditions, some thread-specific and others IFU-specific. For example, certain instruction cache activities (e.g., cache fill), i-TLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved.

In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 202, instructions may actually be fetched for the selected thread. To perform the fetch, in one embodiment, IFU 202 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 202 may store the retrieved instructions within buffers for use by later stages of the instruction pipeline. If there is a cache miss, IFU 202 may coordinate retrieval of the missing cache data from L2 cache 105. In some embodiments, IFU 202 may also be configured to prefetch instructions into instruction cache 205 before the instructions are actually requested to be fetched.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 202 may be configured to predict the direction and target of CTIs (or, in some embodiments, a subset of the CTIs that are defined for an ISA) in order to reduce the delays incurred by waiting until the effect of a CTI is known with certainty.

Through the operations discussed above, IFU 202 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 102, select unit 210 may be configured to select up to one ready thread out of the maximum number of threads concurrently supported by core 102 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 102 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 102 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multi-cycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Figure 3:
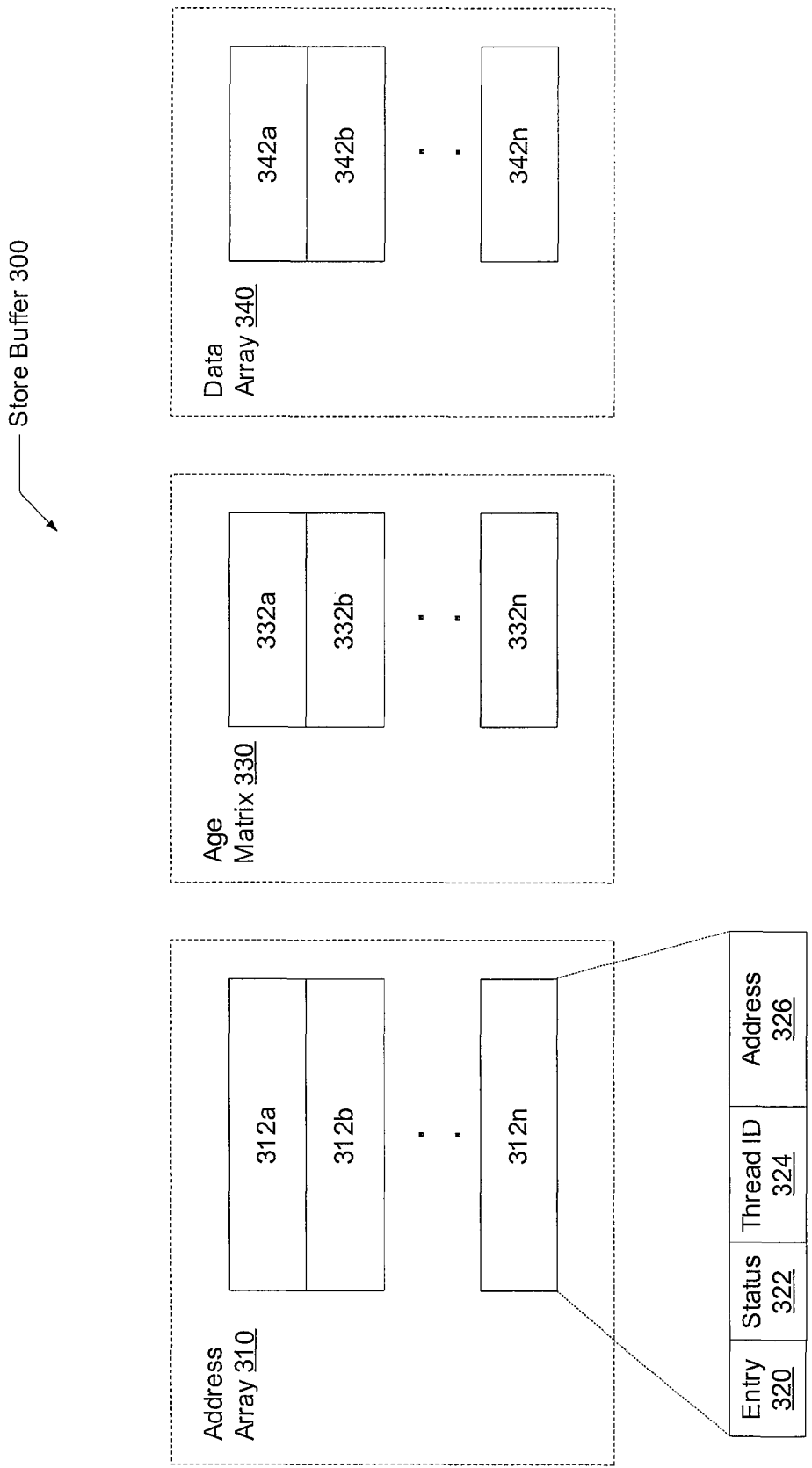
FIG. 3 is a generalized block diagram illustrating one embodiment of a store buffer configured to store issued but not-yet-committed store instructions.

Referring now to FIG. 3, one embodiment of a store buffer 300 configured to store issued but not-yet-committed store instructions is shown. In one embodiment, a store buffer (SB) 300 holds all uncommitted store instructions or operations. The buffered operations may also be micro-operations, or micro-ops, if core 102 is configured to divide instructions into two or more operations. The store buffer 300 may have three main components, such as the address array 310, the age matrix 330, and the data array 340. The address array 310 and the age matrix 320 may be used for read-after-write (RAW) hazard checking as all load instructions, or operations, may need to check the store buffer 300 for RAW hazards when they issue. The data array 340 holds the data of store instructions until these instructions commit, which allows for full RAW bypass from store instructions, which have not yet committed. A single entry of the store buffer 300 may comprise corresponding entries in each of address array 310, age matrix 330, and data array 340. For example, a first entry in the store buffer 300 may comprise entries 312a, 332a, and 342a. A second entry in the store buffer 300 may comprise entries 312b, 332b, and 342b, and so forth.

Once a store instruction commits, the data stored in the data array 340 may be transferred to a store queue. The data for the store may come at a different time than when the corresponding store instruction itself issues. For a particular load instruction, when a RAW hazard is in the store buffer for a particular entry, which has valid data, bypass may occur immediately. For a particular load instruction, when a RAW hazard is detected in the store buffer for a particular entry, which has invalid data, the particular load instruction may enter a load bypass queue and wait for data. The data array 340 is written when a store data operation is issued and is read when the corresponding store instruction commits. A second read port on the data array 340 may be used to read data when a full RAW bypass occurs.

The address array 310 comprises a plurality of entries 312, wherein each entry 312 corresponds to a store instruction, and includes, in one embodiment, an entry number 320, status information 322, a thread identification (ID) number 324, and an address 326. Although the fields are shown in this particular order, other combinations are possible and additional fields may be included. Similarly, the arrangement of address array 310, age matrix 330, and data array 340 may use other placements for better design trade-offs. The entry number 320 corresponds to the position of an entry in the store buffer 300, wherein entry 0 may be configured to be at the top of address array 310 or at the bottom depending on logic preferences. The entry field 320 may be implied rather than an actual stored number. A resource tag, or store buffer tag, corresponding to a single store instruction in the processor core 102 pipeline may be also held per entry in address array 310. Status information 322 may comprise one or more valid bits and cache line MESI protocol information associated with corresponding data stored in the data array 340. A thread identifier (ID) 324 may be used to identify a corresponding thread for a particular store operation when store buffer 300 is located within a processor core 102 configured to concurrently execute multiple threads.

In one embodiment, the address field 326 may hold a physical address and a byte mask. Entries may be written in a pipeline stage after address translation completes. Load instructions may initiate a content-addressable-memory (CAM) operation, typically implemented via dynamic circuit logic, in order to check for an address overlap. In one embodiment, an address overlap occurs when the address 326 matches, the thread ID 324 matches, and any bit in the load mask has a match in the store mask. For entries with address overlap, the CAM will also check for full or partial matches. A full match occurs when each bit in the load mask has a corresponding bit in the store mask. The match is partial otherwise.

As stated earlier, a processor core comprising store buffer 300 may be configured to perform dynamic multithreading. It may not be desirable to instantiate on-chip a separate store buffer 300 for each thread due to on-chip real estate constraints. Also, a single store buffer 300 divided evenly among the maximum number of supported threads, wherein the subdivisions incorporate static allocation, may be inefficient. For example, if processor core 102 is configured to concurrently execute 8 threads and store buffer 300 has 64 total entries (or 64 entries 312, 64 entries 332, and 64 entries 342), then 8 store buffer entries support each thread. However, the 8 entries in this example for thread 0 may not be fully utilized or may not be utilized at all, as thread 0 may not be scheduled with work. Thread 1, on the other hand, may be utilizing all 8 of its store buffer entries and may need more in order to not experience stalls. Therefore, it may be more efficient and provide higher performance to use dynamic allocation of the store buffer entries versus static allocation.

In addition, for the given example, a less number of entries may be used in order to reduce consumption of on-chip real estate, but still provide sufficient performance, such as 32 store buffer entries versus 64 entries. For example, a reorder buffer (ROB) may have 128 entries, but typically, software applications, especially cryptographic applications, do not have one quarter of the instructions be memory reference operations such as load and store instructions. Therefore, having a store buffer of one quarter of the size of a corresponding ROB, or 32 entries, may be more than sufficient. Although the ratio of load instructions to store instructions and the number of store instructions issued (both older and younger) prior to a particular load instruction may vary per application and may be considered for sizing the store buffer, for simplicity, one quarter of the size of the ROB may be chosen for the size of the store buffer. Other methods for sizing the store buffer, such as those mentioned and other, are possible and contemplated. The store buffer entries 312, 332, and 342, in one embodiment, may be dynamically allocated in a pipeline stage corresponding to select unit 210 and deallocated in a commit pipeline stage. A design tradeoff with dynamic allocation of address array entries 312 and data array entries 342 is each entry does not provide an indication of the age of a corresponding out-of-order (o-o-o) issued store instruction relative to other o-o-o issued store instructions and load instructions.

The age matrix 330 may be used to manage the relative ages of all store instructions, or operations, in the store buffer 300. The contents of entries 332a-332n will be described shortly. Entries 312a-312n are not allocated in any particular order with respect to one another. The same is true for entries 332a-332n and entries 342a-342n. Therefore, there may need to be some mechanism for determining the age of store instructions relative to a particular executing load instruction (RAW checks).

The resource tags, or store buffer tags, are assigned in the select pipeline stage while the respective store instructions are still in-order, and these now renamed store instructions are sent in program order to LSU 245. In one embodiment, one tag may be sent each cycle. In an alternative embodiment, multiple tags may be sent each clock cycle at the cost of extra circuitry.

Figure 4:
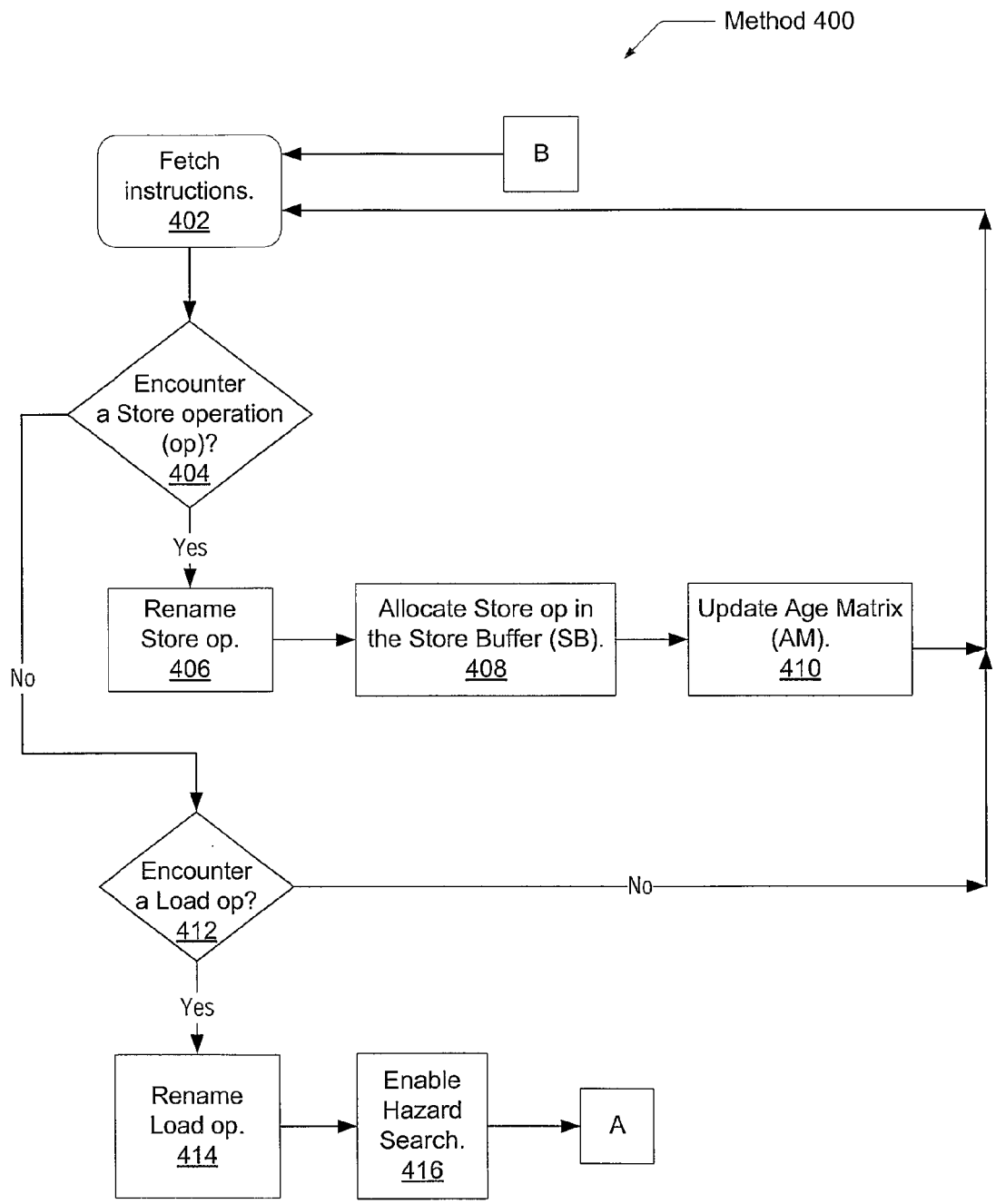
FIG. 4 is a generalized flow diagram illustrating one embodiment of a method for efficient load-store ordering.

Referring now to FIG. 4, one embodiment of a method 400 for efficient load-store ordering is illustrated. The components embodied in the computer system described above may generally operate in accordance with method 400. For purposes of discussion, the steps in this embodiment are shown in sequential order. However, some steps may occur in a different order than shown, some steps may be performed concurrently, some steps may be combined with other steps, and some steps may be absent in another embodiment.

A processor core 102 may be fetching instructions of one or more software applications for execution in block 402. In one embodiment, core 102 may be configured to perform dynamic multithreading. When a store instruction, or operation, is encountered (conditional block 404), or is fetched and begins to traverse a pipeline, such as the pipeline depicted in FIG. 2, the store instruction may receive a store tag in the select unit 210 and is renamed in rename unit 220 in block 406 of method 400. In block 408, an entry in the store buffer 300, such as entries 312a, 332a, and 342a, may be dynamically allocated for this particular store instruction. It is noted the actions corresponding to blocks 402-408 and block 410 described below may each occur in a separate clock cycle, or pipeline stage, or some of the steps may overlap in a same pipeline stage.

Table 1 below depicts one example of an age matrix 330. For simplicity, one embodiment of an 8-entry age matrix 330 is shown. In the example, the following instructions are in program order, wherein "S" denotes a SB tag value for a store instruction and "L" denotes a load instruction: S0, S1, S2, S3, L, S4, S5, S6, S7.

Table 1 below illustrates one embodiment of representing the state of the age matrix 330 after all store instructions, such as S0-S7 in the example, have been renamed. Each entry of age matrix 330 shown in Table 1 comprises an entry field, which may be implied rather than actually stored, a store buffer tag field configured to hold the value provided in the select unit 210, and an age vector (columns 7 to 0), which is a bit vector indicates which entries of the store buffer 300 have store instructions that are younger than a current entry's store instruction. This age vector may be initialized to all zeros, or all logic low values. When an entry in the age matrix 330 is allocated to a renamed store instruction in block 408 of method 400, the corresponding age vector in Table 1 is cleared in order to indicate that the corresponding current store instruction is the youngest instruction in the pipeline at this stage.

TABLE 1

Store Buffer Age Matrix

| Entry | Inst | 7 | 6 | 5 | 4 | 3 | 2 | 1 | 0 | older match | kill | final match |
|---|---|---|---|---|---|---|---|---|---|---|---|---|
| 7 | S6 | * | 0 | 0 | 0 | 1 | 0 | 0 | 0 | 0 | | |
| 6 | S1 | 1 | * | 1 | 0 | 1 | 1 | 1 | 1 | 1 | 1 | |
| 5 | S3 | 1 | 0 | * | 0 | 1 | 0 | 1 | 1 | 1 | | 1 |
| 4 | S0 | 1 | 1 | 1 | * | 1 | 1 | 1 | 1 | 1 | 1 | |

TABLE 1-continued

Store Buffer Age Matrix

| Entry | Inst | 7 | 6 | 5 | 4 | 3 | 2 | 1 | 0 | older match | kill | final match |
|---|---|---|---|---|---|---|---|---|---|---|---|---|
| 3 | S7 | 0 | 0 | 0 | 0 | * | 0 | 0 | 0 | 0 | | |
| 2 | S2 | 1 | 0 | 1 | 0 | 1 | * | 1 | 1 | 1 | 1 | |
| 1 | S5 | 1 | 0 | 0 | 0 | 1 | 0 | * | 0 | 0 | | |
| 0 | S4 | 1 | 0 | 0 | 0 | 1 | 0 | 1 | * | 0 | | |
| | | 0 | 0 | 1 | 0 | 0 | 0 | 0 | 0 | step 1 input vector | | |
| | | 0 | 1 | 1 | 1 | 0 | 1 | 0 | 0 | step 2 input vector | | |

In addition, for all other entries in Table 1, the bit in the position of the entry being renamed (i.e., the column) is set to all ones, or logic high values, in order to indicate that the entry just allocated with a renamed store instruction holds a store instruction younger than store instructions held in all other entries of Table 1. Entry 3 of the age matrix contains the store instruction S7, which is the youngest (in program order) store instruction at this time, and has a corresponding age vector with all zeros, or logic low values. Entry 4 of the age matrix contains the store instruction S0, which is the oldest (in program order) store instruction at this time, and has a corresponding age vector with all ones, or logic high values.

It is noted that the diagonal bits of the age matrix are marked with an asterisk. An instruction is not able to be younger or older than itself. These bits may never actually be written, and their perceived value is different depending on a particular step in a load-store RAW check to be described shortly.

The events that occur and determinations that are made when a particular load instruction is renamed, such as the load instruction denoted by "L" between S3 and S4 in the above example, are now discussed. Control flow of method 400 returns to block 402 after block 410 when the update of the age matrix 330 regarding a dynamic allocation of a store instruction is complete. If a store instruction is not encountered (conditional block 404), then a check is made as to whether a load instruction, or operation, is encountered (conditional block 412), or is fetched and begins to traverse a pipeline, such as the pipeline depicted in FIG. 2. If not, control flow of method 400 returns to block 402. Otherwise, the load instruction is renamed in program order in block 414.

In addition, the load instruction may receive both a load buffer tag corresponding only to the load instruction and a store buffer tag corresponding to the last store instruction to be decoded in program order prior to the load instruction. An associated SB tag value assigned to the particular load instruction, L, shown in the example in Table 1, is the same SB tag value assigned to the last store instruction prior to this particular load instruction, which is S3.

Now a check for all potential RAW hazards and identification of the youngest dependent store instruction needs to be done. This check is a two-step process. The first step finds all RAW hazards in the set of all older (in program order) store instructions. The second step finds the youngest store instruction with respect to the load instruction from the results of the first step, or the group of all RAW hazards. Similarly for blocks 402-410, blocks 412-416 may each occur in a separate pipeline stage, in one embodiment, or, in another embodiment, some of the actions of the steps may overlap within a same pipeline stage.

For the above example shown in Table 1, it is assumed that all store instructions have a thread ID 324 match and an address 326 match with the load instruction denoted by "L". In other words, all eight store instructions S0-S7 of the above example have a thread ID 324 match and an address 326 match with the load instruction. In order to find all older (in program order) store instructions with respect to the load instruction in the age matrix 330 depicted in Table 1, the SB tag value, S3, associated with the load instruction is decoded into a one-hot vector, such as the binary vector 00100000. The store instruction denoted by S3 is in entry 5 of the age matrix 330 depicted in Table 1. Therefore bit 5 of the binary vector is set to 1, while all other bits are set to 0. This one-hot vector is used to enable a read-after-write (RAW) hazard search in block 416 of method 400. This search determines each entry of the age matrix 330 that corresponds to a store instruction older than the load instruction. This search is further described in a subsequent step. Then control flow of method 400 moves to block A.

Figure 5:
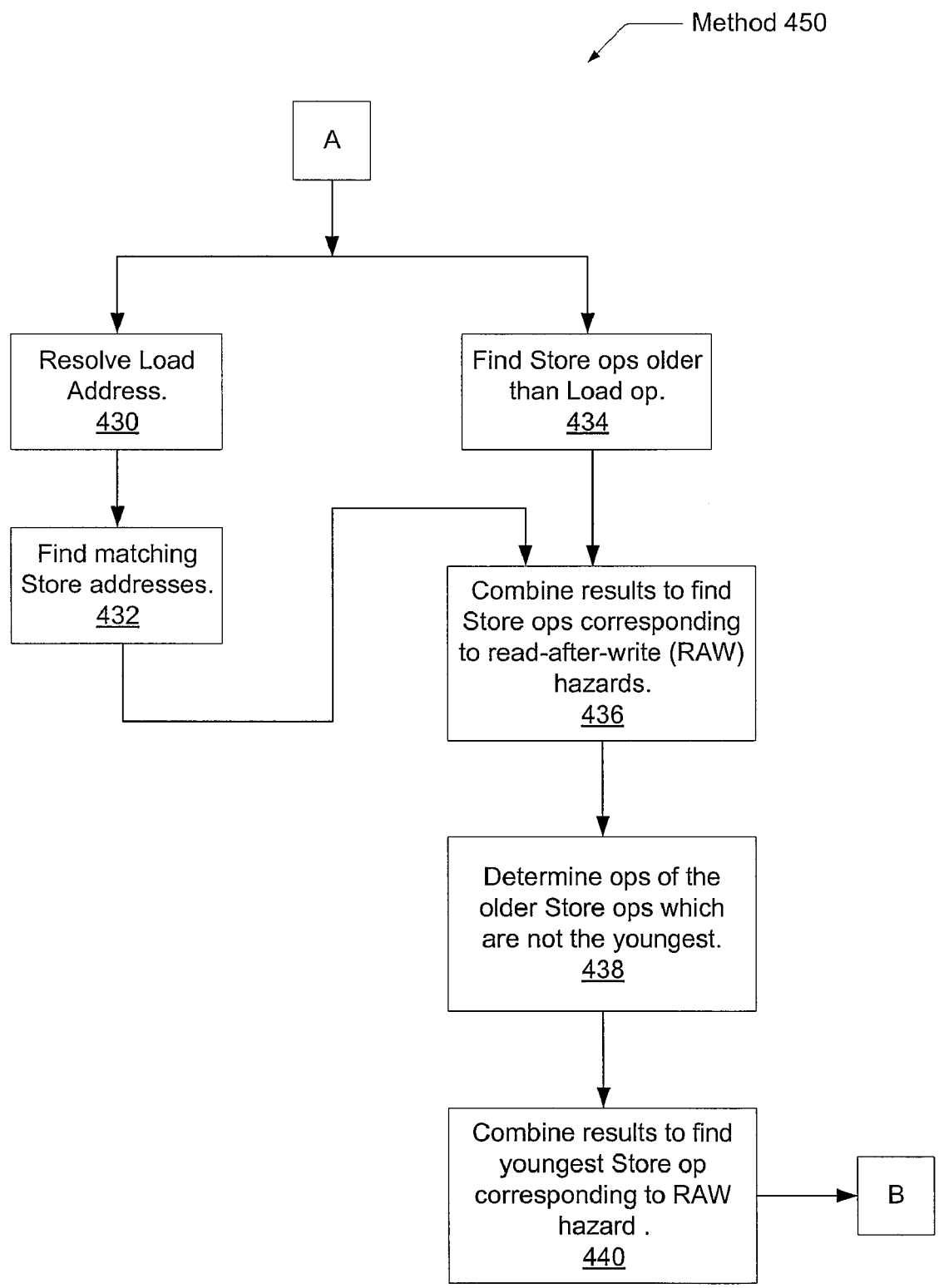
FIG. 5 is a generalized flow diagram illustrating one embodiment of a method for continuing efficient load-store ordering.

Referring now to FIG. 5, one embodiment of a method 450 that continues method 400 for efficient load-store ordering is illustrated. The components embodied in the computer system described above may generally operate in accordance with method 450. For purposes of discussion, the steps in this embodiment are shown in sequential order. However, some steps may occur in a different order than shown, some steps may be performed concurrently, some steps may be combined with other steps, and some steps may be absent in another embodiment.

In block 430, the load address is resolved and it is compared to each store address 326 in the age matrix 330 in block 432. Also, a comparison of respective thread ID 324 values is performed. The load address may be a result of an adder in an execution unit. A source operand used for the computation may have been an architectural register value that was either read from an architectural register or forwarded from a bypass bus or a storage element in issue unit 230 based upon scheduling logic. The comparison, in one embodiment, may be performed by content-addressable-memory (CAM) matching circuitry, which may be implemented with dynamic logic.

In parallel, in block 434 of method 450, a search is performed for the store instructions that are older (in program order) than the load instruction, such as store instructions S0-S3 in the above example. A binary logic AND-OR (AO) operation is performed between the generated one-hot vector from the load instruction's SB tag value (5) and the age vector (columns 7 to 0) of each entry in the age matrix 330. The one-hot vector is designated as "step 1 input vector" in Table 1 above. Entries 2, 4, and 6 in Table 1, which correspond with store operations S2, S0, and S1, have a logic high value, or a one, generated from the AO operation due to storing a logic one in column 5 of the age vector. Entry 5 is marked with an asterisk in its column 5. As said before, the diagonal of the combined age vector entries is perceived to have a different value during two steps. A bit of the age vector corresponding to the diagonal is an identity bit, wherein an identity bit position of any age vector is the bit position corresponding to the position of the corresponding entry of the store buffer 300 relative to all entries of the store buffer 300.

In a first step, the perceived value of each identity bit within an age vector is a logic one, or high, value. Therefore, entry 5 also generates a logic one value from the AO operation. All store operations buffered in the age matrix 330 that are older than the particular load operation are identified in this step.

Following, in block 436, the generated pre-qualified older match vector is combined with a vector generated from the address match hits found in the comparisons performed in block 432. In this simplified example, it is assumed all of the store operations are valid, have a same thread ID 324 as the load instruction, and have a same address 326 as the load operation. The combining may be a binary AND operation on a bit-by-bit basis of the two vectors. Due to the simplification of the example, the generated qualified older match vector of this AND operation has the same values as the pre-qualified older match vector. This generated vector is also shown as the "step 2 input vector" in Table 1. This generated vector illustrates the total set of RAW hazards.

In block 438, the generated vector representing the total set of RAW hazards, or the "step 2 input vector" in Table 1, is used in a second AO operation with the age vector (columns 7 to 0) of each entry of the age matrix 330. For this second iteration of the AO reduction operations, the diagonal of the combined age vector entries is perceived to have a logic zero value versus a logic high value as before. The result of this second iteration of AO operations provides a "kill" vector, which indicates the entries that are not the youngest store instruction of the set of older store instructions. Finally, in block 440, an inverse of the kill vector is combined by an AND binary operation with the generated vector representing the total set of RAW hazards, or the "step 2 input vector" in Table 1. The result is the youngest store instruction of the set of RAW hazards with respect to the load instruction.

Both in-order issue of instructions and a statically partitioned, and thus statically allocated, store buffer degrade computing performance of a multithreaded processor. The steps described in methods 400 and 450 provides for the maintenance of load-store ordering in a dynamic multi-threaded processor without needing the load and store operations to issue in-order. In addition, the methods don't require a store buffer to be statically partitioned in order to accommodate multiple threads.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A store buffer comprising:
an array configured to dynamically allocate an entry of a plurality of entries for an issued store instruction, wherein each entry of said entries is configured to store a thread identifier (TID), an address, and age information relative to other issued store instructions; and
circuitry configured to:
determine a first set of entries of the plurality of entries that have store instructions older in program order than a load instruction, wherein the store instructions have a same TID and address as the load instruction; and
identify an entry of the first set of entries that corresponds to a youngest store instruction of the first set.

2. The store buffer as recited in claim 1, wherein the age information stored in a given entry of the plurality of entries comprises an age vector, wherein the age vector comprises a plurality of bits including a bit for each entry of the plurality of entries, wherein each bit of the bits indicates whether the given entry is associated with a store instruction that is older in program order than store instructions associated with other entries of the plurality of entries.

3. The store buffer as recited in claim 2, wherein the circuitry is further configured to interpret a value of an identity bit position of an age vector of the given entry as a different binary value depending on a current operation being performed, wherein the identity bit is a bit position corresponding to a position of the given entry within the plurality of entries.

4. The store buffer as recited in claim 3, wherein the circuitry is further configured to decode into a one-hot bit vector an identifier associated with said load instruction, wherein the identifier indicates an entry of the plurality of entries storing a most recent store instruction to issue prior to said load instruction in program order.

5. The store buffer as recited in claim 4, wherein for each entry of the plurality of entries, the circuitry is further configured to:
interpret the identity bit as a value that indicates whether a store instruction corresponding to another entry of the entries is younger; and
perform a first AND-OR reduction with said age vector and said one-hot vector to generate a pre-qualified older match bit.

6. The store buffer as recited in claim 5, wherein for each entry of the plurality of entries the circuitry is further configured to generate a set qualified older match bit, responsive to determining a corresponding pre-qualified older match bit is set, a valid bit stored in the entry indicates a valid entry, and the entry has a same TID and address as the load instruction, wherein a first set is a bit vector comprising the plurality of qualified older match bit values.

7. The processor as recited in claim 6, wherein for each entry of the plurality of entries the circuitry is further configured to:
interpret the identity bit as a value that indicates whether a store instruction corresponding to another entry is older; and
perform a second AND-OR reduction with said age vector corresponding to an entry and said first set to generate a kill bit value, wherein said second set is a bit vector comprising the plurality of kill bit values.

8. The processor as recited in claim 7, wherein the circuitry is further configured to perform a binary AND operation on a bit-by-bit basis with said first set and an inverted said second set to generate a final match vector, wherein the final match vector has a single set bit corresponding to an entry having the youngest store instruction of said first set.

9. A method comprising:
dynamically allocating an entry of a plurality of entries of an array, said plurality of entries being configured to store information associated with an issued store instruction;

storing in an entry of the array a thread identifier (TID), an address, and age information relative to other issued store instructions;

determining a first set of entries of the plurality of entries that have store instructions older in program order than a load instruction, wherein the store instructions have a same TID and address as the load instruction; and identifying an entry of the first set of entries that corresponds to a youngest store instruction of the first set.

10. The method as recited in claim 9, wherein the age information stored in a given entry of the plurality of entries comprises an age vector, wherein the age vector comprises a plurality of bits including a bit for each entry of the plurality of entries, wherein each bit of the bits indicates whether the given entry is associated with a store instruction that is older in program order than store instructions associated with other entries of the plurality of entries.

11. The method as recited in claim 10, further comprising interpreting a value of an identity bit position of an age vector of the given entry as a different binary value depending on a current operation being performed, wherein the identity bit is a bit position corresponding to a position of the given entry within the plurality of entries.

12. The method as recited in claim 11, further comprising decoding into a one-hot bit vector an identifier associated with said load instruction, wherein the identifier indicates an entry of the plurality of entries storing a most recent store instruction to issue prior to said load instruction in program order.

13. The method as recited in claim 12, further comprising for each entry of the plurality of entries:

interpreting the identity bit as a value that indicates whether a store instruction corresponding to another entry of the entries is younger; and performing a first AND-OR reduction with said age vector and said one-hot vector to generate a pre-qualified older match bit.

14. The method as recited in claim 13, further comprising, for each entry of the plurality of entries, generating a set qualified older match bit, responsive to determining a corresponding pre-qualified older match bit is set, a valid bit stored in the entry indicates a valid entry, and the entry has a same TID and address as the load instruction, wherein a first set is a bit vector comprising the plurality of qualified older match bit values.

15. The method as recited in claim 14, further comprising for each entry of the plurality of entries:

interpreting the identity bit as a value that indicates whether a store instruction corresponding to another entry is older; and performing a second AND-OR reduction with said age vector corresponding to an entry and said first set to generate a kill bit value, wherein said second set is a bit vector comprising the plurality of kill bit values.

16. The method as recited in claim 15, further comprising performing a binary AND operation on a bit-by-bit basis with said first set and an inverted said second set to generate a final match vector, wherein the final match vector has a single set bit corresponding to an entry having the youngest store instruction of said first set.

17. A computer readable storage medium storing program instructions operable to perform load-store ordering, wherein the program instructions are executable to:

dynamically allocate an entry of a plurality of entries of an array, said plurality of entries being configured to store information associated with an issued store instruction;

store in an entry of the array a thread identifier (TID), an address, and age information relative to other issued store instructions;

determine a first set of entries of the plurality of entries that have store instructions older in program order than a load instruction, wherein the store instructions have a same TID and address as the load instruction; and identify an entry of the first set of entries that corresponds to a youngest store instruction of the first set.

18. The storage medium as recited in claim 17, wherein the age information stored in a given entry of the plurality of entries comprises an age vector, wherein the age vector comprises a plurality of bits including a bit for each entry of the plurality of entries, wherein each bit of the bits indicates whether the given entry is associated with a store instruction that is older in program order than store instructions associated with other entries of the plurality of entries.

19. The storage medium as recited in claim 18, wherein the instructions are further executable to interpret a value of an identity bit position of an age vector of the given entry as a different binary value depending on a current operation being performed, wherein the identity bit is a bit position corresponding to a position of the given entry within the plurality of entries.

20. The storage medium as recited in claim 19, wherein the program instructions are further executable to decode into a one-hot bit vector an identifier associated with said load instruction, wherein the identifier indicates an entry of the plurality of entries storing a last store instruction to issue prior to said load instruction in program order.

* * * * *